United States Patent [19]

Jones

[11] Patent Number: 4,736,504
[45] Date of Patent: Apr. 12, 1988

[54] ALIGNMENT METHOD FOR PRESSURE WELDED BLADED DISK

[75] Inventor: Terry L. Jones, Monroe, Ohio

[73] Assignee: The United States of America as represented by the Secretary of the Navy, Washington, D.C.

[21] Appl. No.: 88,351

[22] Filed: Aug. 12, 1987

[51] Int. Cl.⁴ .............................................. B21K 3/04
[52] U.S. Cl. ........................... 29/156.8 B; 29/156.8 R; 29/423; 228/160
[58] Field of Search ................... 29/156.8 B, 156.8 R, 29/423; 228/160, 161, 212; 416/213 R, 239; 415/208, 216

[56] References Cited

U.S. PATENT DOCUMENTS

| | | | |
|---|---|---|---|
| 3,012,308 | 12/1961 | Zeeh et al. | 29/156.8 B |
| 3,088,192 | 5/1963 | Turner | 29/156.8 |
| 3,246,389 | 4/1966 | Pfau | 29/200 |
| 3,255,515 | 6/1966 | Clarke | 29/156.8 |
| 3,768,147 | 10/1973 | Berry et al. | 29/470.3 |
| 3,967,353 | 7/1976 | Pagnotta et al. | 29/156.8 R |
| 3,982,854 | 9/1976 | Berry et al. | 416/213 R |
| 4,152,816 | 5/1979 | Ewing et al. | 29/156.8 R |
| 4,164,061 | 8/1979 | Bronousky et al. | 29/156.8 B |
| 4,183,558 | 1/1980 | Broodman | 285/189 |

Primary Examiner—Howard N. Goldberg
Assistant Examiner—Irene Cuda
Attorney, Agent, or Firm—Harvey A. David; William C. Townsend

[57] ABSTRACT

A method for manufacturing bladed disks, or blisks, for turbines by pressure welding of blades or outer airfoil elements to blade stives or inner airfoil elements on a disk is characterized by the provision on the outer and inner airfoil elements of flanges of excess flash material having alignment holes for dowel pins that assure alignment of leading and trailing edges of the airfoil elements during pressure welding, followed by removal of the excess flash material and the included dowel pins.

2 Claims, 1 Drawing Sheet

ALIGNMENT METHOD FOR PRESSURE WELDED BLADED DISK

BACKGROUND OF THE INVENTION

This invention relates to the assembly of turbine blades by pressure welding to a hub or disk to form a bladed disk, or "blisk", and more particularly to such a method that assures accurate positioning of a preformed blade component with a preformed blade root or stub element on the hub.

Welding of flow directing blades to hubs of turbine rotors or stators by pressure or other welding techniques requires accurate positioning of the blade element, especially establishment of correct airfoil leading and trailing edge alignment. This has been accomplished through complex and expensive jigs and clamps, use of withdrawable mandrels, or costly machining of parts to have cooperating interdigitation of elements that remain after welding.

The rotational positioning of airfoil blade outer halves with preformed blade stubs or inner halves is rendered particularly difficult by the compound curves that are characteristic of the blade to produce progressively changing airfoil sections along the length thereof.

With the foregoing in mind, it is a principal object of the invention to provide a method of, and components for, effecting accurate positioning of blade components during pressure welding without the need for complex jigs, clamps, or mandrels.

Another object of the invention is to provide a method of assembly utilizing pressure welding and which is more reliable and economical and which results in a finished turbine blade and hub that is free of included keys, pins, mandrels or other alignment devices that might provide a locus for failure under stress.

As yet another object, it is an aim of the invention to provide a method for fabrication of turbine flow directing rotors or stators having a disk or hub and an upper airfoil or blade pressure welded to a lower airfoil or blade stub on the disk, the method being characterized by the provision of excess flash or flanges on the upper and lower airfoils, providing the flanges with locating holes, providing disposable dowels or alignment pins in said holes, pressure welding the blade and stub, including their flanges and pins, togethr, and machining away the excess flange material and pins.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENT

Figure 1:
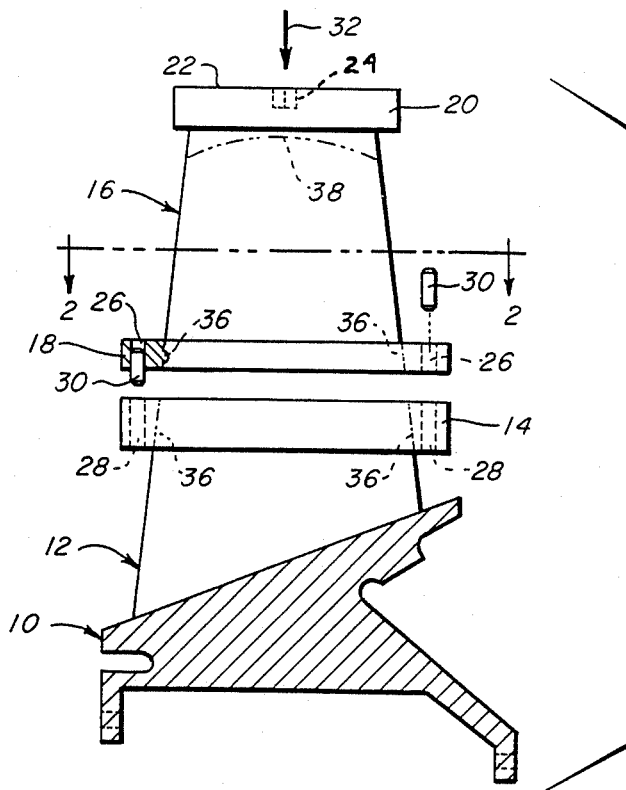
FIG. 1 is a fragmentary sectional view of a turbine disk showing upper and lower airfoil components in side elevation before pressure welding.

Referring now to FIG. 1, an annular turbine disk or hub is indicated generally at 10 and is provided about its periphery with a plurality of generally radially extending lower airfoil elements, one of which is illustrated at 12. Each such lower airfoil element 12 is provided at its outer end with a transverse flange 14 of excess flash material. The lower airfoil element, and its flange 14, is formed of a pressure weldable material suitable for turbine blade use.

An upper airfoil element 16, formed of the same material as the lower element 14, comprises a compound curved airfoil provided at its lower end with a transverse flange 18 of excess flash material. The upper end of the upper airfoil element 16 is provided with a transverse flange 20 having a pressure welding press engageable surface 22. A recess 24 may be provided in that surface for locating the assembly in the press.

Figure 2:
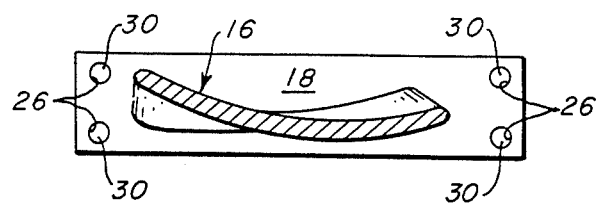
FIG. 2 is a sectional view taken substantially along line 2—2 of FIG. 1.

Referring to FIG. 2, the flange 18 of the upper airfoil element 16 is conveniently rectangular in shape, and is provided with locating holes 26 in the four corner areas thereof. The flange 14 at the upper end of the lower airfoil element 12 is substantially congruent with flange 18, and is provided with corresponding locating holes 28.

Disposable dowel pins 30 are inserted into the locating holes 26,28 and serve to orient the upper airfoil element 16 relative to the lower airfoil element 12 when the flange 14 is placed in juxtaposition on the flange 18. With the upper airfoil element 16 so oriented, pressure is applied on surface 22 in the direction of arrow 32 along the stacking axis of the assembly with sufficient force to effect welding together of the upper and lower airfoil elements at their mating surfaces Thereafter, the welded together excess flash material of flanges 14 and 18 is machined away, along with the included dowel pins 30, to the finished airfoil surfaces indicated by dotted line 36. Similarly, the blade tip is finished by removal of the flange 20 by cutting along a finish tip cut line 38.

Obviously, other embodiments and modifications of the subject invention will readily come to the mind of one skilled in the art having the benefit of the teachings presented in the foregoing description and the drawing. It is, therefore, to be understood that this invention is not to be limited thereto and that said modifications and embodiments are intended to be included within the scope of the appended claims.

What is claimed is:

1. A method of producing a turbine blade and disk assembly, the method comprising the steps of:

providing an annular disk having a plurality of lower airfoil elements formed of pressure weldable material, each lower airfoil element having at its outer end a first flange of excess flash material, said first flange having a plurality of locating holes therein;

providing an upper airfoil element having at its inner end a second flange of excess flange material, said second flange having a plurality of locating holes therein that are in registration with the holes in said first flange when the flanges are in mating juxtaposition with said upper and lower airfoils in predetrmined alignment;

providing a plurality of disposable dowel pins in said holes and cooperating with said flanges to maintain said predetermined alignment;

applying pressure on the outer end of said upper airfoil element so as to weld said upper and lower airfoil elements, including the juxtaposed flanges, together; and removing by machining away said excess flash material and included dowel pins.

2. The method defined in claim 1, and wherein said upper airfoil element has a third flange formed at the outer end thereof and presenting a surface for application of said pressure; and further comprising the additional step of removing said third flange by cutting along a predetermined tip cut line.

* * * * *